(12) United States Patent
Takahashi

(10) Patent No.: US 11,012,801 B2
(45) Date of Patent: May 18, 2021

(54) REPRODUCTION DEVICE, REPRODUCTION METHOD, AND ON-VEHICLE SPEAKER SYSTEM

(71) Applicant: JVCKENWOOD Corporation, Yokohama (JP)

(72) Inventor: Kenichi Takahashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/901,722

(22) Filed: Jun. 15, 2020

(65) Prior Publication Data

US 2020/0314579 A1 Oct. 1, 2020

Related U.S. Application Data

(63) Continuation of application No. PCT/JP2018/037053, filed on Oct. 3, 2018.

(30) Foreign Application Priority Data

Jan. 19, 2018 (JP) .............................. JP2018-007544

(51) Int. Cl.
| | |
|---|---|
| *H04S 7/00* | (2006.01) |
| *H04R 3/12* | (2006.01) |
| *H04R 5/04* | (2006.01) |
| *H04R 29/00* | (2006.01) |

(52) U.S. Cl.
CPC ............ *H04S 7/301* (2013.01); *H04R 3/12* (2013.01); *H04R 5/04* (2013.01); *H04R 29/002* (2013.01); *H04R 2430/01* (2013.01); *H04R 2430/20* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 6,498,856 B1 | 12/2002 | Itabashi et al. | |
| 2003/0043051 A1 | 3/2003 | Shiraishi | |
| 2006/0262937 A1* | 11/2006 | Kobayashi | H04S 3/002 381/27 |

(Continued)

FOREIGN PATENT DOCUMENTS

| | | |
|---|---|---|
| CN | 1273192 A | 11/2000 |
| JP | H07-162998 A | 6/1995 |

(Continued)

*Primary Examiner* — Paul W Huber
(74) *Attorney, Agent, or Firm* — Procopio, Cory, Hargreaves & Savitch LLP

(57) ABSTRACT

A reproduction device according to an embodiment is a reproduction device configured to output a reproduction signal to a speaker system including a first speaker unit group and a second speaker unit group disposed behind the first speaker unit group, the reproduction device including: first delay circuits configured to delay reproduction signals output to speaker units included in the first speaker unit group; and second delay circuits configured to delay reproduction signals output to speaker units included in the second speaker unit group. In the second speaker unit group, a delay time in accordance with a distance difference between a distance and a distance and a longitudinal distance is set for the second delay circuit.

8 Claims, 4 Drawing Sheets

(56) References Cited

U.S. PATENT DOCUMENTS

| | | | |
|---|---|---|---|
| 2010/0208900 A1* | 8/2010 | Amadu | H04S 3/002 381/17 |
| 2011/0058684 A1* | 3/2011 | Ohta | H04S 1/00 381/97 |
| 2012/0155651 A1* | 6/2012 | Obata | H04S 3/002 381/17 |
| 2015/0043746 A1* | 2/2015 | Iseki | H04R 3/12 381/97 |
| 2016/0014505 A1* | 1/2016 | Iseki | H04R 1/403 381/86 |

FOREIGN PATENT DOCUMENTS

| | | |
|---|---|---|
| JP | H07-203598 A | 8/1995 |
| JP | 2005-323025 A | 11/2005 |
| JP | 2012-235456 | 11/2012 |
| WO | 2012/172394 A1 | 12/2012 |

* cited by examiner

REPRODUCTION DEVICE, REPRODUCTION METHOD, AND ON-VEHICLE SPEAKER SYSTEM

CROSS REFERENCE TO RELATED APPLICATION

The present application is a Bypass Continuation of PCT/JP2018/037053 filed on Oct. 3, 2018, which is based upon and claims the benefit of priority from Japanese Patent Application No. 2018-007544, filed on Jan. 19, 2018, the entire contents of which are hereby incorporated by reference.

BACKGROUND

The present disclosure relates to a reproduction device, a reproduction method, and an on-vehicle speaker system.

Patent Literature 1 (Japanese Unexamined Patent Application Publication No. H07-162998) discloses an on-vehicle acoustic device including four speakers. The on-vehicle acoustic device delays an acoustic signal transmitted from a sound source and transmits the signal to each speaker. That is, a speaker that is farther from a listening position is set as a reference and a delay is allotted to a speaker that is closer to a delay circuit.

A delay time is allotted to a left front speaker and a left rear speaker so that the phases of the sounds from the left front speaker and the left rear speaker that reach the left ear of a driver coincide with each other.

Patent Literature 2 (Japanese Unexamined Patent Application Publication No. H07-203598) discloses an on-vehicle digital audio system including four speakers. In Patent Literature 2, the signal applied to a speaker system is delayed in accordance with the speaker system furthest from a listening position. By this configuration, the distance from the listening position to each speaker system is equivalently equidistant.

Patent Literature 3 (Japanese Unexamined Patent Application Publication No. 2012-235456) discloses a voice signal processing device for appropriately delaying a signal in accordance with a size of a room. Left and right front speakers and a center speaker are disposed on the front side of the listening position, and left and right surround speakers are disposed on the rear side of the listening position. The voice signal processing device receives a front channel signal and a surround channel signal and outputs a delay surround channel signal that is delayed by a prescribed time from the surround channel signal. This delay time is determined in accordance with a difference in a distance from each speaker to the listening position (paragraph 0037).

The voice signal processing device adds a delay surround signal to the front channel signal. The front speaker outputs the front channel signal to which the delay surround signal is added. Further, in order to make the sound pressure level of the sounds equal at the listening position, a sound volume adjustment circuit corrects the level of an acoustic signal and applies the signal to each speaker.

SUMMARY

In Patent Literatures 1 to 3, even though the center localization can be corrected, since the sound is output from the front and the rear sides of the listener, a feeling of strangeness in the auditory image may be caused. Further, in a seat other than the driver seat in which the listener sits, the preceding sound effect does not become minimal, and thus the listener may be caused to feel the strangeness.

The present disclosure has been made in view of such a problem and an object thereof is to provide a reproduction device, a reproduction method, and an on-vehicle speaker system.

A reproduction device according to an embodiment is a reproduction device configured to output a reproduction signal to a speaker system including a first speaker unit group disposed in front of a listener and a second speaker unit group disposed behind the listener, the reproduction device including:

a first delay circuit configured to delay a reproduction signal output to a speaker unit included in the first speaker unit group; and a second delay circuit configured to delay a reproduction signal output to a speaker unit included in the second speaker unit group, in which the first speaker unit group includes a first left speaker unit and a first right speaker unit, the second speaker unit group includes a second left speaker unit and a second right speaker unit, in the first speaker unit group, a first delay time in accordance with a first distance difference between a distance from a reference position to a speaker unit furthest from the reference position and a distance from the reference position to another speaker unit is set for the first delay circuit, and in the second speaker unit group, a second delay time in accordance with a second distance difference between a distance from the reference position to a speaker unit furthest from the reference position and a distance from the reference position to another speaker unit and a first longitudinal distance from a speaker unit included in the first speaker unit group to a speaker unit included in the second speaker group is set for the second delay circuit.

A reproduction method according to an embodiment is a reproduction method of reproducing music by a speaker unit system that includes a first speaker unit group and a second speaker unit group disposed behind the first speaker unit group, the reproduction method including:

a step of delaying a reproduction signal by a first delay circuit and outputting the reproduction signal to a first speaker unit group and delaying the reproduction signal by a second delay circuit and outputting the reproduction signal to a second speaker unit group; and a step of outputting the reproduction signal from the first speaker unit group and the second speaker unit group, in which the first speaker unit group includes at least a first left speaker unit and a first right speaker unit, the second speaker unit group includes at least a second left speaker unit and a second right speaker unit, in the first speaker unit group, a first delay time in accordance with a first distance difference between a distance from a reference position to a speaker unit furthest from the reference position and a distance from the reference position to another speaker unit is set for the first delay circuit, and in the second speaker unit group, a second delay time in accordance with a second distance difference between a distance from the reference position to the speaker unit furthest from the reference position and a distance from the reference position to another speaker unit and a first longitudinal distance from a speaker unit included in the first speaker unit group to a speaker unit included in the second speaker group is set for the second delay circuit.

According to the present disclosure, a reproduction device, a reproduction method, and an on-vehicle speaker system that can appropriately localize an acoustic image can be provided.

DETAILED DESCRIPTION

First Embodiment

Figure 1:
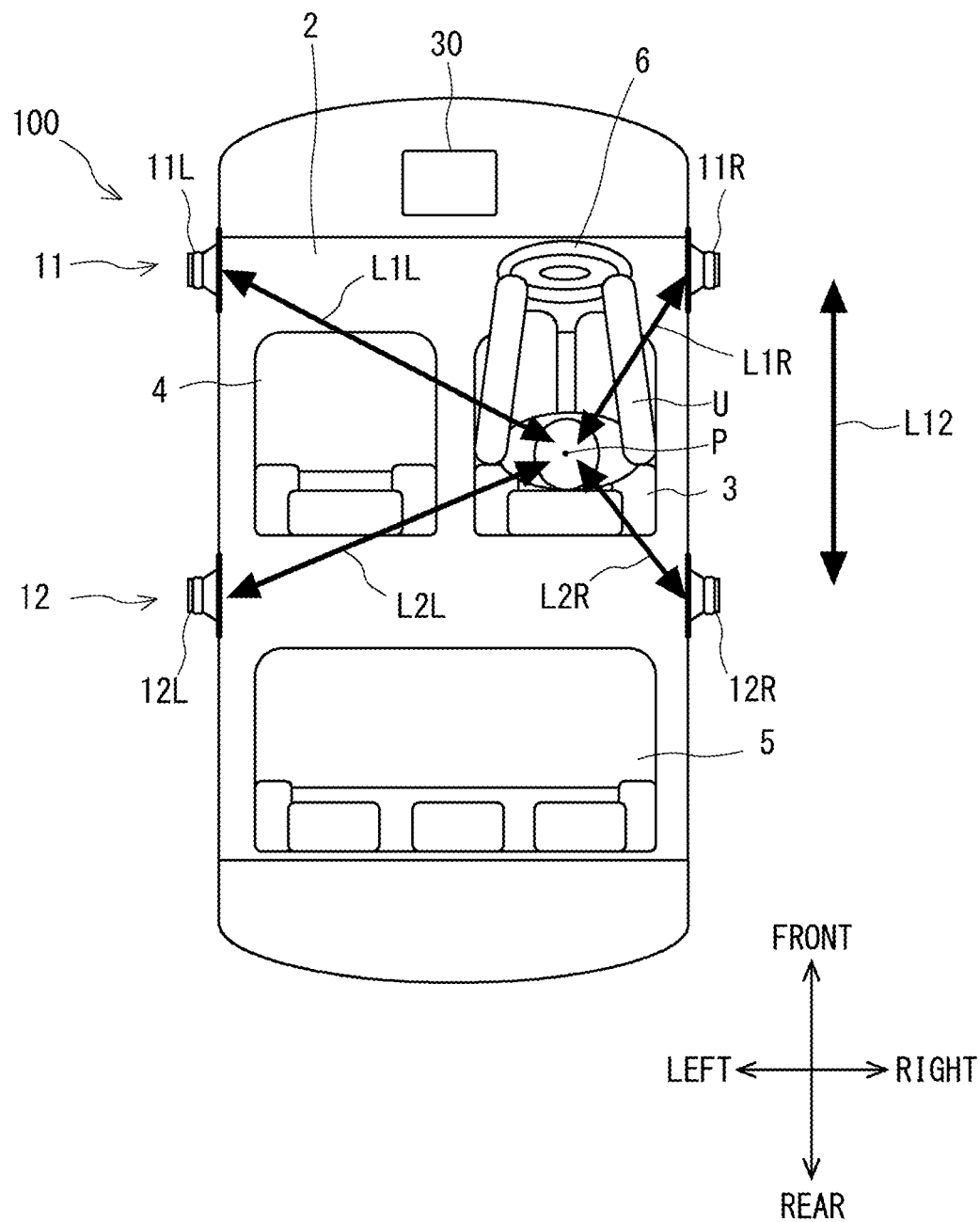
FIG. 1 is a diagram showing an on-vehicle speaker system according to a first embodiment.

A reproduction device and an on-vehicle speaker system according to the present embodiment is described using FIG. 1. FIG. 1 is a schematic diagram showing a vehicle interior 2 of a car 1 viewed from the above. In the explanation given below, the longitudinal direction and the lateral direction are defined based on a driver U who is the listener as shown in FIG. 1. The longitudinal direction and the lateral direction shown in FIG. 1 coincide with the longitudinal direction and the lateral direction of the car 1 in the advancing direction thereof.

The vehicle interior 2 of the car 1 includes a driver seat 3, a passenger seat 4, a rear seat 5, and a steering wheel 6. The steering wheel 6 is disposed in front of the driver seat 3. The driver U who sits in the driver seat 3 is the target listener. Here, explanation is given on the condition that the car 1 is a car having a right-side steering wheel in which the steering wheel 6 is disposed on the right-hand side. Therefore, the driver seat 3 is disposed on the right-hand side in the front row and the passenger seat 4 is disposed side-by-side thereto on the left-hand side in the front row. Further, the rear seat 5 is disposed behind the driver seat 3 and the passenger seat 4.

Furthermore, the vehicle interior 2 is equipped with an on-vehicle speaker system 100 including a first speaker unit group 11, a second speaker unit group 12, and a reproduction device 30. The reproduction device 30 is disposed to, for example, a dashboard. The reproduction device 30 is a processing device including a sound source, a decoder, a DSP (Digital Signal Processor), a D/A (Digital to Analog) converter, an amplifier and so on. The sound source is, for example, an MP3 (MPEG Audio Layer-3) player or a CD (Compact Disc) player, and may be an external device. Further, a part or all of the reproduction device 30 can be implemented as a function of a car navigation system.

The first speaker unit group 11 and the second speaker unit group 12 are disposed within the vehicle interior 2. The reproduction device 30 outputs a reproduction signal for reproducing music within the vehicle interior 2. The reproduction device 30 outputs, for example, stereo music signals of L-ch and R-ch to the first speaker unit group 11 and the second speaker unit group 12. The driver U can listen to music within the vehicle interior 2.

The first speaker unit group 11 includes a first left speaker unit 11L and a first right speaker unit 11R. The first left speaker unit 11L is disposed to a front door on the left-hand side, that is, to a door on the passenger seat 2 side. The first right speaker unit 11R is disposed to a front door on the right-hand side, that is, to a door on the driver seat 3 side.

The second speaker unit group 12 includes a second left speaker unit 12L and a second right speaker unit 12R. The second left speaker unit 12L is disposed to a rear door on the left-hand side and the second right speaker unit 12R is disposed to a rear door on the right-hand side. Of course, the place where the speaker unit is disposed is not specifically limited. For example, it may be disposed to the dashboard or behind the rear seat.

The second speaker unit group 12 is disposed behind the first speaker unit group 11. The first speaker unit group 11 is a front speaker unit group that is disposed on the front side of the driver U and the second speaker unit group 12 is a rear speaker unit group that is disposed behind the driver U. In other words, the first left speaker unit 11L and the first right speaker unit 11R are front speaker units for L-ch and R-ch, respectively, and the second left speaker unit 12L and the second right speaker unit 12R are rear speaker units for L-ch and R-ch, respectively. Here, the first left speaker unit 11L, the first right speaker unit 11R, the second left speaker unit 12L, and the second right speaker unit 12R are full-range speakers.

Music reproduced by the reproduction device 30 is output from the plurality of speaker units 11L, 11R, 12L, and 12R. The reproduction device 30 includes a delay circuit that delays a reproduction signal input to each of the speaker units. The delay time set for the reproduction signal transmitted to each of the plurality of speaker units 11L, 11R, 12L, and 12R is explained below. The position of the head of the driver U who is the target listener is referred to as a reference position P. Note that in the present embodiment, since the car 1 has a right-side steering wheel, a distance from the reference position P to the right speaker unit is shorter than a distance from the reference position P to the left speaker unit in each of the speaker unit groups.

A distance from the reference position P to the first left speaker unit 11L is referred to as L1L, a distance from the reference position P to the first right speaker unit 11R is referred to as L1R, a distance from the reference position P to the second left speaker unit 12L is referred to as L2L, and a distance from the reference position P to the second right speaker unit 12R is referred to as L2R. Further, a distance from the first speaker unit group 11 to the second speaker unit group 12 in the longitudinal direction is referred to as L12. Note that the distance from the first left speaker unit 11L to the second left speaker unit 12L and the distance from the first right speaker unit 11R to the second right speaker unit 12R in the longitudinal direction are the same.

A measurement value obtained through a measuring tape or the like can be used for the distance from the reference position P to each of the speaker units. For example, assuming that the position of the head of the driver U who is seated in the driver seat 3 is the reference position P, the driver U or another person measures the distance from the reference point P to each of the speaker units using a measuring tape. The distance measured by the driver U etc. is input to the reproduction device 30. Alternatively, the distance may be measured using various sensors.

Here, the delay time (the arrival time) from the reference position P to each of the speaker units is calculated as described below. Note that the sound velocity $c=331.5+0.61t$ [m/s] and t denotes temperature [□].

A delay value D1L with respect to the first left speaker unit 11L is expressed by the following Expression (1).

$$D1L[s] = L1L[m]/c[m/s] \qquad (1)$$

In the same way, delay values D1R, D2L, and D2R with respect to the first right speaker unit 11R, the second left speaker unit 12L, and the second right speaker unit 12R can be expressed by the following Expressions (2), (3), and (4), respectively.

$$D1R[s]=L1R[m]/c[m/s] \quad (2)$$

$$D2L[s]=L2L[m]/c[m/s] \quad (3)$$

$$D2R[s]=L2R[m]/c[m/s] \quad (4)$$

The delay value (the delay time) set between the first speaker unit group 11 and the second speaker unit group 12 is expressed by the following Expression (5).

$$D12[s]=L12[m]/c[m/s] \quad (5)$$

In the first speaker unit group 11, a lateral delay time is set between the first left speaker unit 11L and the first right speaker unit 11R in accordance with a time alignment method. A delay time in accordance with a distance difference (L1L-L1R) between the distance L1R and the distance L1L is set between the first left speaker unit 11L and the first right speaker unit 11R. By allotting a delay time to the lateral reproduction signal as described above, the arrival time of the reproduction signals of L-ch and R-ch to the driver U can be brought to be the same. Thus, it is possible to minimize the lateral preceding sound effect as much as possible.

Here, the car 1 has a right-side steering wheel and the driver U who sits in the driver seat is the target listener. The first right speaker unit 11R is relatively close to the reference position P and the first left speaker unit 11L is relatively far from the reference position P. The distance L1R is shorter than the distance L1L. The delay time with respect to the first right speaker unit 11R is set longer than the delay time with respect to the first left speaker unit 11L. Assuming that the delay time with respect to the first left speaker unit 11L that is relatively far is 0[s], delay times D1R' and D1L' set between the first right speaker unit 11R and the first left speaker unit 11L in the first speaker unit group 11 are expressed by the Expressions (6) and (7).

$$D1R'=D1L-D1R \quad (6)$$

$$D1L'=0[s] \quad (7)$$

Also in the second speaker unit group 12, a lateral delay time is set between the second left speaker unit 12L and the second right speaker unit 12R in accordance with the time alignment method. A delay time in accordance with a distance difference (L2L-L2R) between the distance L2R and the distance L2L is set between the second left speaker unit 12L and the second right speaker unit 12R. By allotting a lateral delay time as described above, the arrival time of the reproduction signals of L-ch and R-ch to the driver U can be brought to be the same. Thus, it is possible to minimize the lateral preceding sound effect as much as possible.

In the second speaker unit group 12 as well, the distance L2R is shorter than the distance L2L. Therefore, the delay time with respect to the second right speaker unit 12R is set longer than the delay time with respect to the second left speaker unit 12L. Assuming that the delay time with respect to the second left speaker unit 12L that is relatively far is 0[s], a delay time is set for the second speaker unit group 12 in a similar manner as that for the first speaker unit group 11. That is, the delay times D2R' and D2L' set between the second right speaker unit 12R and the second left speaker unit 12L in the second speaker unit group 12 are expressed by the Expressions (8) and (9).

$$D2R'=D2L-D2R \quad (8)$$

$$D2L'=0[s] \quad (9)$$

Further, the delay time D12 in accordance with the longitudinal distance L12 is set between the first speaker unit group 11 and the second speaker unit group 12. By adding the delay time D12 corresponding to the longitudinal distance to the second speaker unit group 12, the delay times D2R" and D2L" set for the second right speaker unit 12R and the second left speaker unit 12L, respectively are expressed by the Expression (10) and the Expression (11).

$$D2R''=D2R'+D12 \quad (10)$$

$$D2L''=D2L'+D12=D12 \quad (11)$$

The delay times D2R" and D2L" become the delay times allotted to the second right speaker unit 12R and the second left speaker unit 12L, respectively. That is, the reproduction device 30 delays the reproduction signals transmitted to the first left speaker unit 11L, the first right speaker unit 11R, the second left speaker unit 12L, and the second right speaker unit 12R by the delay times D1L', D1R', D2L", and D2R", respectively.

By adding the delay time D12 to the delay times D2R' and D2L' allotted to the second speaker unit group 12, the delay times D2R" and D2R" with respect to the second right speaker unit 12R and the second left speaker unit 12L are calculated. As described above, only the second speaker unit group 12 is added with the delay time D12 delayed by the longitudinal distance L12. Thus, the delay time can be easily set.

Next, how the sound volume is set is explained. The reproduction device 30 controls a sound volume level in accordance with a difference in the distance from the reference position to each of the speaker units. Specifically, among the four speaker units of the first speaker unit group 11, the first right speaker unit 11R is the closest to the reference position P. Therefore, the sound volume of the first left speaker unit 11L is not changed while the sound volume of the first right speaker unit 11R, the second left speaker unit 12L, and the second right speaker unit 12R are turned down. In accordance with the inverse square law, a sound volume level V1F of the first left speaker unit 11L and a sound volume level V1R of the first right speaker unit 11R can be calculated from the following Expressions (12) and (13).

$$V1R=10*\log(1/(L1L/L1R)^2)[dB] \quad (12)$$

$$V1L=0[dB] \quad (13)$$

The sound volume level can be calculated in a similar manner for the second speaker unit group 12 based on the inverse square law of the distance from the second speaker unit group 12 to the driver U. A sound volume level V2R of the second right speaker unit 12R and a sound volume level V2L of the second left speaker unit 12L are expressed by the following Expressions (14) and (15).

$$V2R=10*\text{Log}(1/(L1L/L2R)^2)[dB] \quad (14)$$

$$V2L=10*\text{Log}(1/(L1L/L2L)^2)[dB] \quad (15)$$

In setting the sound volume of each of the speaker units, the preceding sound effect of the first speaker unit group 11 on the front side can be emphasized when the sound volume of the second speaker unit group 12 is turned down with respect to the sound volume of the first speaker unit group 11.

Actually, there is reflection by the glass and the interior materials etc. as well as sound absorption by the seats within the vehicle interior 2. There are cases where even when the first speaker unit group 11 and the second speaker unit group 12 are the same unit, there is already a difference in the sound volume between the two groups. It is desirable to observe and determine the sound volume level by performing microphone measurement. Or, it is desirable to adjust the volume so that the volume level of the second speaker unit group 12 is lower than that of the first speaker unit group 11 according to the auditory sense of the driver U. When the sound volume of the first speaker unit group 11 and the second speaker unit group 12 can be heard at the same level, the following Expression (16) may hold true.

$$V1 > V2 \qquad (16)$$

In the explanation given above, it has been described that the first left speaker unit 11L, the first right speaker unit 11R, the second left speaker unit 12L, and the second right speaker unit 12R are full range speakers, however, in a 2-way or a 3-way configuration, the delay times between the first speaker unit group 11 and the second speaker unit group 12 may be set independently.

In the present embodiment, the lateral preceding sound effect can be made the minimum. That is, the delay time between the first left speaker unit 11L and the first right speaker unit 11R as regards the first speaker unit group 11 is delayed based on the time alignment method and the delay time between the second left speaker unit 12L and the second right speaker unit 12R as regards the second speaker unit group 12 is delayed based on the time alignment method. Accordingly, it is possible to maintain the center localization. For example, it is possible to localize a monaural component (a line component) in front of the driver U.

Further, the second speaker unit group 12 is delayed with respect to the first speaker unit group 11. That is, the reproduction device 30 allots a delay time to the second speaker unit group 12 in accordance with the longitudinal distance L12 between the speaker unit included in the first speaker unit group 11 and the speaker unit included in the second speaker unit group 12. Therefore, the preceding sound effect can be emphasized with respect to the first speaker unit group 11. By this configuration, the sound localization of the sound from the front side becomes natural creating the feeling of embracement, and a natural space can be obtained. In addition, it is possible to reduce the feeling of strangeness in the auditory image.

The longitudinal distance L12 between the speaker units in the longitudinal direction is measured, and the reproduction device 30 allots the delay time in accordance with the longitudinal distance L12 to the second speaker unit group 12. Accordingly, the delay time can be set easily. By this configuration, it is possible to cause a lag in the arrival time between the first speaker unit group 11 and the second speaker unit group 12. An acoustic wave from the first speaker unit group 11 arrives at the driver U earlier than an acoustic wave from the second speaker unit group 12. Therefore, the preceding sound effect can be emphasized with respect to the first speaker unit group 11.

Further, the acoustic wave of the first speaker unit group 11 is output before the acoustic wave from the second speaker unit group 12 is output. Therefore, even when a passenger who is seated in the passenger seat 4 or the rear seat 5 is the listener, it is possible to reduce the feeling of strangeness felt by the passenger compared to the case where the standard time alignment method is employed.

Since only the way to allot the delay time to each of the speaker units is changed, there is no change in the delay circuit.

In the aforementioned explanation, since the car 1 has a right-side steering wheel, a lateral delay time is allotted to the first right speaker unit 11R and the second right speaker unit 12R. However, in the case of a car having a left-side steering wheel or a car having a right-side steering wheel in which a passenger who is the listener is seated in the passenger seat, the lateral delay time may be allotted inversely. For example, assuming that the delay time of the first right speaker unit 11R is 0, the delay time in accordance with the distance difference is allotted to the first left speaker unit 11L, and a delay time obtained by adding the delay time in accordance with the longitudinal distance to the delay time in accordance with the distance difference is allotted to the second left speaker unit 12L and the second right speaker unit 12R. Further, as regards the sound volume in the case of a car having a left-side steering wheel, the sound volumes of the speaker units should be adjusted in a similar manner.

Second Embodiment

Figure 2:
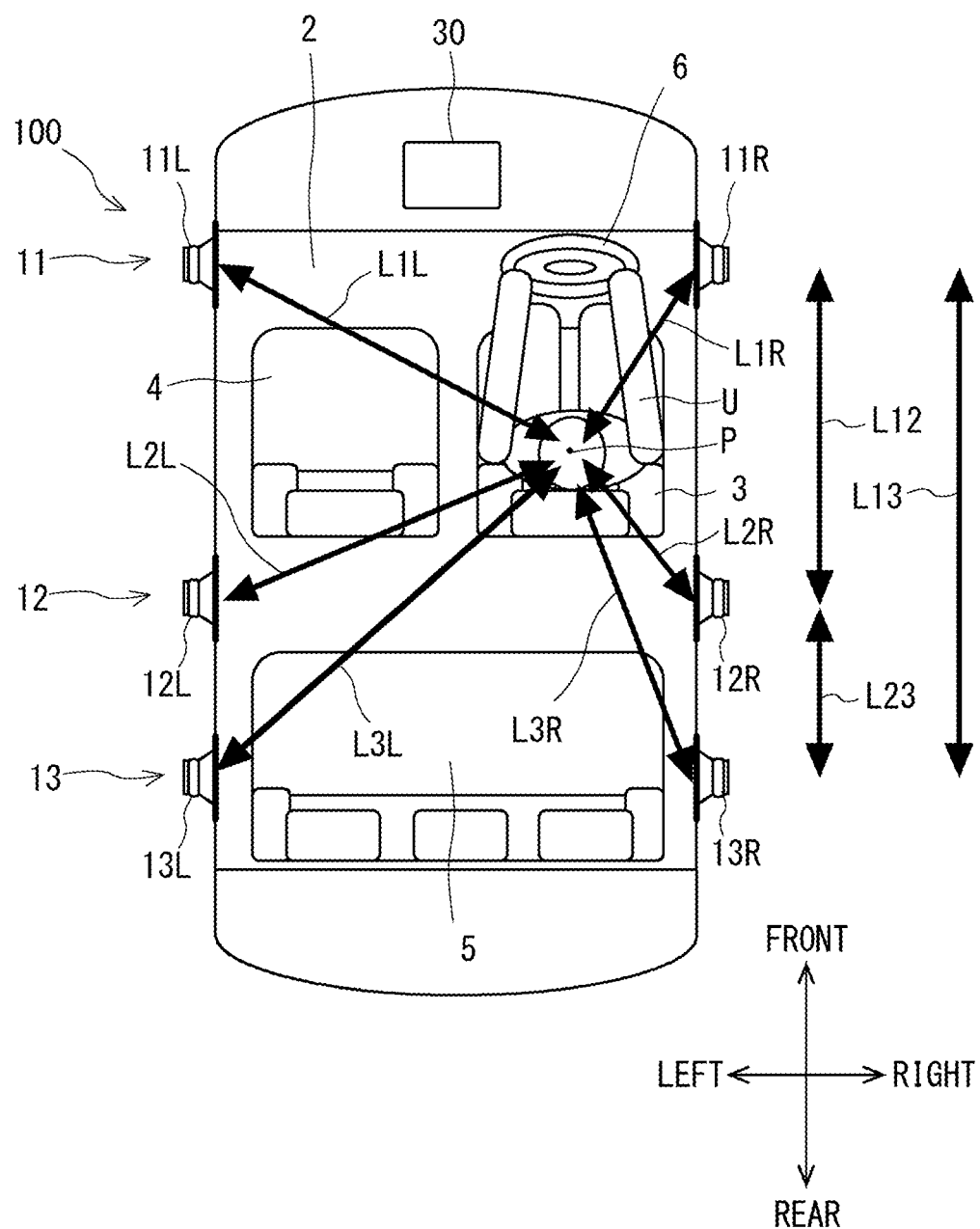
FIG. 2 is a diagram showing an on-vehicle speaker system according to a second embodiment.

A reproduction device and a speaker system according to a second embodiment is described using FIG. 2. FIG. 2 is a diagram schematically showing the vehicle interior 2 of the car 1 to which the speaker system 100 is mounted. In the second embodiment, in addition to the configuration of the first embodiment, a third speaker unit group 13 is added. The basic configuration and process other than those of the third speaker unit group 13 are the same as those of the first embodiment, and thus explanations thereof are omitted.

The third speaker unit group 13 includes a third left speaker unit 13L and a right speaker unit 13R. The third speaker unit group 13 is disposed behind the rear seat 5. The third speaker unit group 13 is disposed behind the second speaker unit group 12. Therefore, in the second embodiment, the third speaker unit group 13 is a rear speaker unit group that is disposed on the rearmost side.

As shown in FIG. 2, a distance from the reference position P to the third left speaker unit 13L is referred to as L3L and a distance from the reference position P to the third right speaker unit 13R is referred to as L3R. The distance between the first speaker unit group 11 and the third speaker unit group 13 in the longitudinal direction is referred to as a longitudinal direction distance L13. The distance between the second speaker unit group 12 and the third speaker unit group 13 in the longitudinal direction is referred to as a longitudinal direction distance L23. L13=L12+L23 holds true.

In the third speaker unit group 13, a lateral delay time is set between the third left speaker unit 13L and the third right speaker unit 13R in accordance with the time alignment method in the same manner as that set in the first speaker unit group 11 and the second speaker unit group 12. A delay time in accordance with a distance difference (L3L−L3R) between the distance L3R and the distance L3L is set between the third left speaker unit 13L and the third right speaker unit 13R. By allotting a lateral delay time as described above, it is possible to minimize the lateral preceding sound effect as much as possible.

The delay times (the arrival times) D3L and D3R with respect to the third left speaker unit 13L and the third right speaker unit 13R are expressed by the following Expressions (17) and (18).

$$D3L[s] = L3L[m]/c[m/s] \qquad (17)$$

$$D3R[s]=L3R[m]/c[m/s] \quad (18)$$

The delay value (the delay time) D13 set between the first speaker unit group 11 and the third speaker unit group 13 is expressed by the following Expression (19).

$$D13[s]=L13[m]/c[m/s]=(L12+L23)[m]/c[m/s]= \quad (19)$$

In the third speaker unit group 13 as well, the distance L3R is shorter than the distance L3L. Assuming that the delay time with respect to the third left speaker unit 13L that is far is 0[s], a delay time is set for the third speaker unit group 13 in a similar manner as that for the first speaker unit group 11 and the second speaker unit group 12. That is, in the third speaker unit group 13, the lateral delay times D3R' and D3L' set for the third right speaker unit 13R and the third left speaker unit 13L, respectively are expressed by the Expression (20) and the Expression (21).

$$D3R'=D3L-D3R[s]= \quad (20)$$

$$D3L'=0[s]= \quad (21)$$

Further, the delay time D13 in accordance with the longitudinal distance L13 between the first speaker unit group 11 and the third speaker unit group 13 is set. By adding the delay time D13 corresponding to the longitudinal distance to the third speaker unit group 13, the following Expressions (22) and (23) hold true.

$$D3R''=D3R'+D13 \quad (22)$$

$$D3L''=D3L'+D13=D13 \quad (23)$$

The delay times D3R" and D3L" are the delay times allotted to the third right speaker unit 13R and the third left speaker unit 13L. As described above, the delay time in accordance with the longitudinal distance L13 is allotted between the first speaker unit group 11 and the third speaker unit group 13. In other words, the delay time in accordance with the longitudinal distance D23 is allotted between the second speaker unit group 12 and the third speaker unit group 13. By this configuration, even when the number of the speaker units is equal to or larger than six, the same effect as that achieved in the first embodiment can be obtained.

Figure 3:
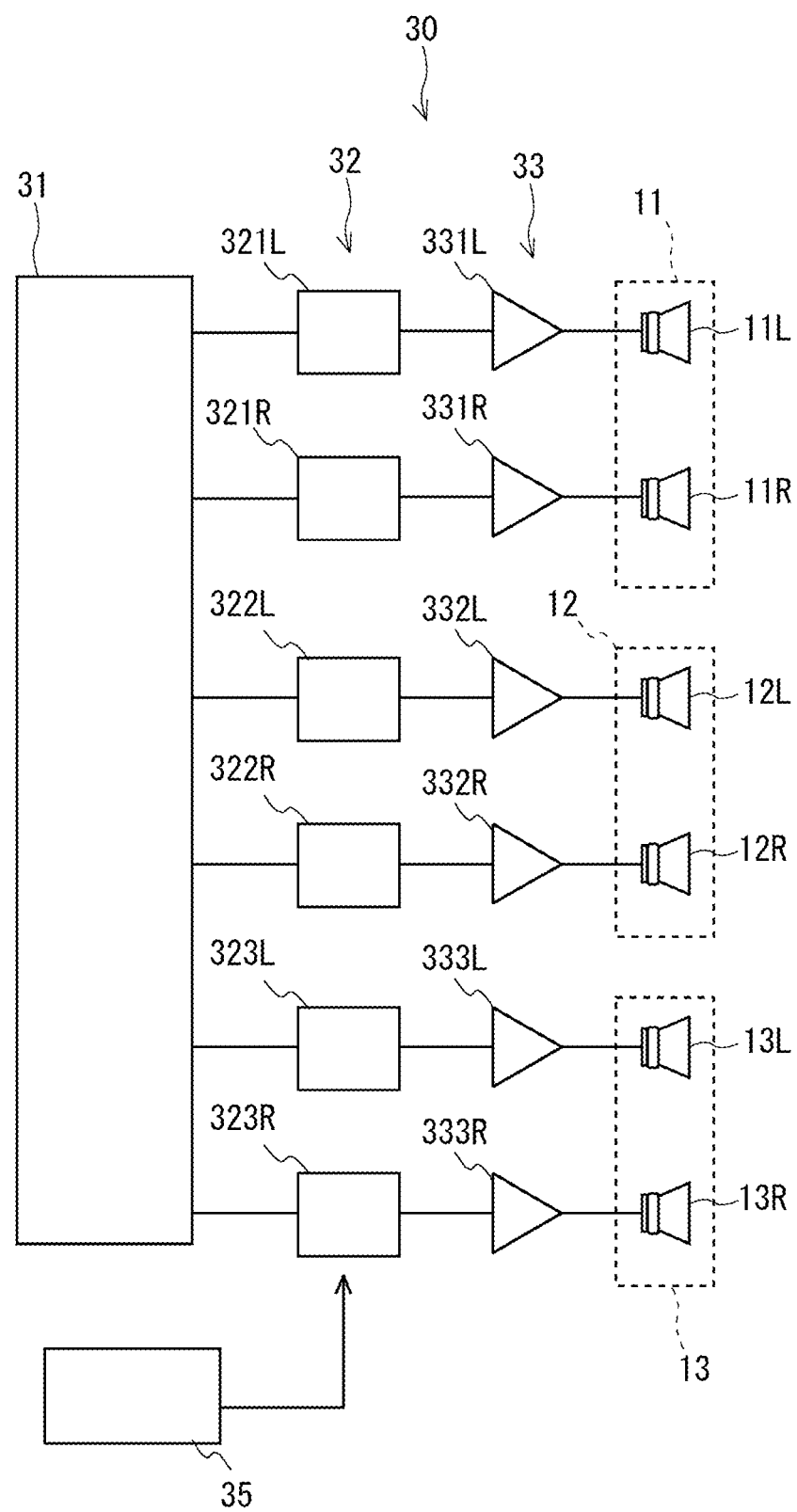
FIG. 3 is diagram showing a delay circuit of an on-vehicle speaker system.

Next, a configuration of the reproduction device 30 is described using FIG. 3. FIG. 3 is a block diagram showing the configuration of reproduction device 30. The reproduction device 30 includes a sound source 31, a delay unit 32, an amplifier unit 33, and an input unit 35.

In the second embodiment, since there are six speaker units, the reproduction device 30 outputs six reproduction signals to the respective speaker units. The delay unit 32 includes six delay circuits 321L, 321R, 322L, 322R, 323L, and 323R for the respective speaker units. The delay unit 32 may be implemented as a function of the DSP. In this case, a D/A convertor is disposed at a latter part of the delay unit 32. In a similar manner, the amplifier unit 33 includes six amplifiers 331L, 331R, 332L, 332R, 333L, and 333R. The amplifiers 331L, 331R, 332L, 332R, 333L, and 333R may be built-in within the speaker unit.

The sound source 31 outputs the reproduction signal to each of the six speaker units 11L, 11R, 12L, 12R, 13L, and 13R. The number of channels of the reproduction signal is not specifically limited. The delay circuit 321L delays the reproduction signal transmitted to the first left speaker unit 11L and outputs the delayed signal to the amplifier 331L. The amplifier 331L amplifies the reproduction signal and outputs the amplified signal to the first left speaker unit 11L.

In a similar manner, the delay circuit 321R delays the reproduction signal with respect to the first right speaker unit 11R and outputs the delayed signal to the amplifier 331R. The amplifier 331R amplifies the reproduction signal and outputs the amplified signal to the first right speaker unit 11R. As described above, the delay time D1L' is set for the delay circuit 321L and the delay time D1R' is set for the delay circuit 321R.

The delay circuit 322L delays the reproduction signal transmitted to the second left speaker unit 12L and outputs the delayed signal to the amplifier 331L. The amplifier 332L amplifies the reproduction signal and outputs the amplified signal to the second left speaker unit 12L. The delay circuit 322R delays the reproduction signal transmitted to the second right speaker unit 12R and outputs the amplified signal to the amplifier 332R. The amplifier 332R amplifies the reproduction signal and outputs the amplified signal to the second right speaker unit 12R. As described above, the delay time D2L" is set for the delay circuit 322L and the delay time D2R" is set for the delay circuit 322R.

The delay circuit 323L delays the reproduction signal transmitted to the third speaker unit 13L and outputs the delayed signal to the amplifier 333L. The amplifier 333L amplifies the reproduction signal and outputs the amplified signal to the third left speaker unit 13L. The delay circuit 323R delays the reproduction transmitted to the third right speaker unit 13R and outputs the delayed signal to the amplifier 333R. The amplifier 333R amplifies the reproduction signal and outputs the amplified signal to the third right speaker unit 13R. As described above, the delay time D3L" is set for the delay circuit 323L and the delay time D3R" is set for the delay circuit 323R.

By having the six speaker units output the reproduction signal, music can be reproduced. The sound localization of the sound from the front side becomes natural and an appropriate acoustic image can be reproduced. The delay time in the delay unit 32 is input through the input unit 35. For example, the input unit 35 is provided with an input device such as a touch panel or a button. Further, by having the driver U etc. operate the input unit 35, the distance measured using the measuring tape is input. By this configuration, the reproduction device 30 inputs the delay time with respect to each speaker unit in accordance with the Expressions mentioned above.

Furthermore, either one or both of the delay times D12 and D13 can be made to be adjustable. By having the driver U operate the input unit 35, the delay time D12 or the delay time D13 can be changed. Further, the reproduction device 30 delays the reproduction signal by the delay time and outputs the delayed signal to each of the speaker unit groups. An auditory test is conducted by having the driver U listen to a music that is played according the reproduction signal. From the result of the auditory test that is repeated by increasing/decreasing the delay time D12 or the delay time D13, the delay time which is most suitable for the driver U is selected. By this configuration, the delay time can be finely adjusted and the acoustic image can be localized more appropriately.

Further, the sound volume of each of the speaker unit groups can be adjusted by adjusting an amplification factor in each amplifier in the amplifier unit 33. The amplification unit 33 may adjust the sound volume level in accordance with the distance difference. Further, by having the driver U operate the input unit 35, the sound volume of each of the speaker units may be adjusted.

The reproduction device 30 may not be limited to a physically single device. For example, it may be configured as a device in which the delay unit 32 and the amplifier unit 33 are separated devices. Further, the sound source 31 may be an MP3 player or the like that is externally connected to the reproduction device 30. In this case, the sound source 31 is connected to the reproduction device 30 via a USB (Universal Serial Bus), Bluetooth (registered trademark) or the like. The reproduction device 30 shown in FIG. 3 can be employed in the first embodiment as well. In this case, the reproduction device 30 should include the delay circuit and the amplifiers with respect to the four speaker units.

In this embodiment, the speaker unit 100 may further include a fourth speaker unit group disposed behind the third speaker unit group 13. In this case as well, in a similar manner as described above, the delay time may be set based on the longitudinal distance between the speaker units included in the fourth speaker unit group and the speaker units included in the first speaker unit group 11.

Third Embodiment

Figure 4:
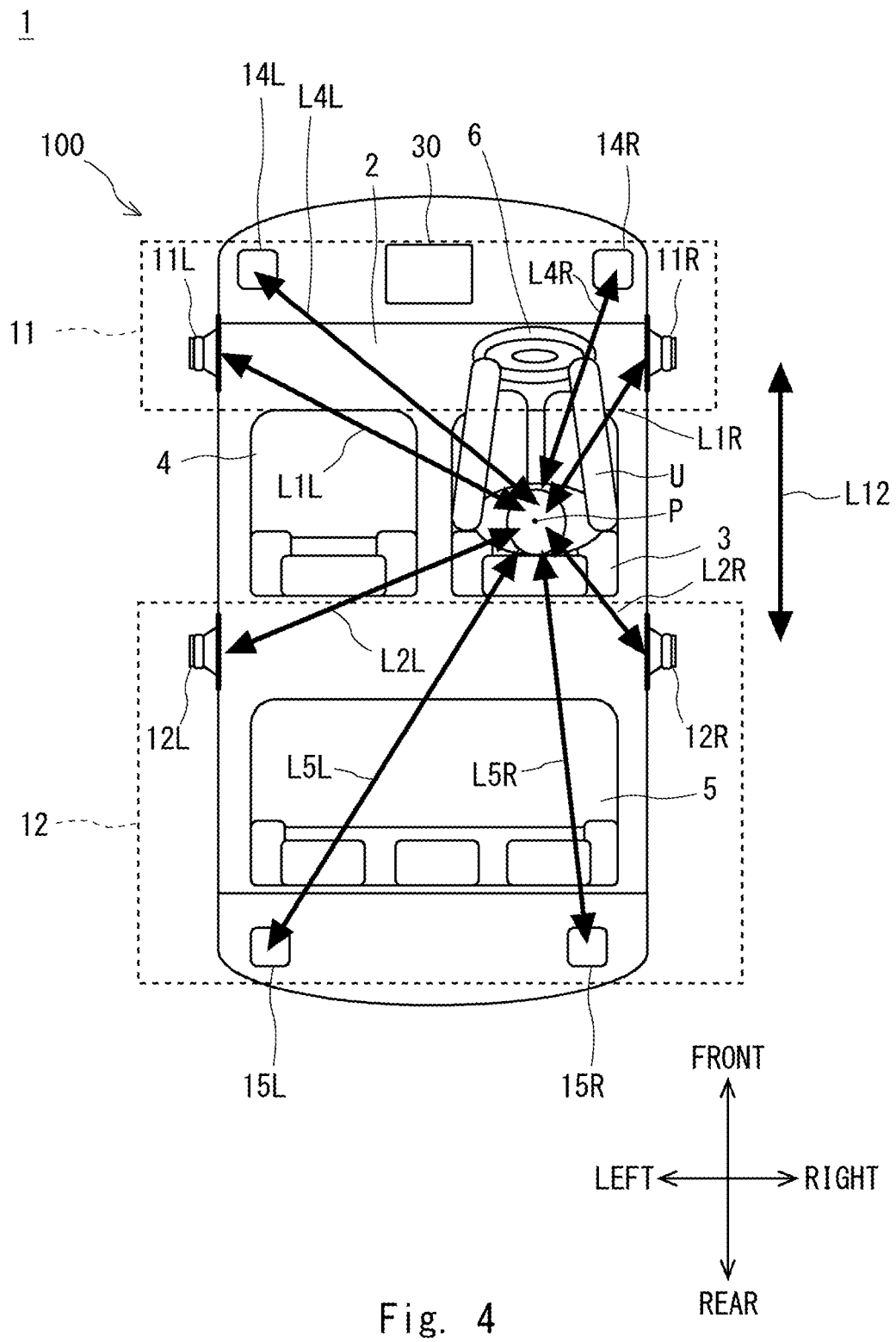
FIG. 4 is a diagram showing an on-vehicle speaker system according to a third embodiment.

A reproduction device and a speaker system according to a third embodiment is described using FIG. 4. FIG. 4 is a diagram schematically showing the vehicle interior 2 of the car 1 on which the speaker system 100 mounted.

In the third embodiment, a fourth left speaker unit 14L, a fourth right speaker unit 14R, a fifth left speaker unit 15L, and a fifth right speaker unit 15R are added to the configuration shown in FIG. 1. In the first and second embodiments, the number of speaker units included in one speaker unit group is two, however in the third and the fourth embodiment, the number thereof is four. The configuration other than the fourth left speaker unit 14L, the fourth right speaker unit 14R, the fifth left speaker unit 15L, and the fifth right speaker unit 15R and the process are the same as those described in the first embodiment, and thus explanations thereof are omitted.

The first speaker unit group 11 includes the first left speaker unit 11L, the first right speaker unit 11R, the fourth left speaker unit 14L, and the fourth right speaker unit 14R. The fourth left speaker unit 14L and the fourth right speaker unit 14R are disposed on the front side of the first left speaker unit 11L and the first right speaker unit 11R.

The second speaker unit group 12 is disposed behind the fifth left speaker unit 15L that includes the second left speaker unit 12L, the second right speaker unit 12R, the fourth left speaker unit 14L, and the fourth right speaker unit 14R, and the fifth right speaker unit 15R is disposed behind the second left speaker units 12L and 12R.

The fourth left speaker unit 14L and the fourth right speaker unit 14R are disposed in the first row from the front, and the first left speaker unit 11L and the first right speaker unit 11R are disposed in the second row from the front. The second left speaker unit 12L and the second right speaker unit 12R are disposed in the third row from the front and the fifth left speaker unit 15L and the fifth right speaker unit 15R are disposed in the fourth row from the front.

Distances from the reference position P to the fourth left speaker unit 14L and to the fourth right speaker unit 14R are referred to as L4L and L4R, respectively. Distances from the reference position P to the fifth left speaker unit 15L and to the fifth right speaker unit 15R are referred to as L5L and L5R, respectively. The delay times (the arrival times) D4L, D4R, D5L, and D5R with respect to the fourth left speaker unit 14L, the fourth right speaker unit 14R, the fifth left speaker unit 15L, and the fifth right speaker unit 15R are expressed by the following Expressions (24) and (27).

$$D4L[s]=L4L[m]/c[m/s] \quad (24)$$

$$D4R[s]=L4R[m]/c[m/s] \quad (25)$$

$$D5L[s]=L5L[m]/c[m/s] \quad (26)$$

$$D5R[s]=L5R[m]/c[m/s] \quad (27)$$

Further, the fourth left speaker unit 14L, the fourth right speaker unit 14R, the first left speaker unit 11L, and the first right speaker unit 11R that are disposed in front of the driver U constitute the first speaker unit group 11. Delay times for the fourth left speaker unit 14L, the fourth right speaker unit 14R, the first left speaker unit 11L, and the first right speaker unit 11R are included in the first speaker unit group 11 are set according to the time alignment method.

Among the fourth left speaker unit 14L, the fourth right speaker unit 14R, the first left speaker unit 11L, and the first right speaker unit 11R, the fourth left speaker unit 14L is the furthest from the reference position P, and thus it is set as a reference. Assuming that the delay time with respect to the fourth left speaker unit 14L is 0, delay times are set for the fourth right speaker unit 14R, the first left speaker unit 11L, and the first right speaker unit 11R in accordance the distance difference.

The delay time D4R' with respect to the fourth right speaker unit 14R is set based on the distance difference (L4L−L4R). In the similar manner, the delay times D1L' and D1R' with respect to the first left speaker unit 11L and the first right speaker unit 11R are set by the distance difference (L4L−L1L) and the distance difference (L4L−L1R), respectively. The delay times D1L', D1R', D4L', and D4R' set among the speaker units of the first speaker unit group 11 are expressed by the following Expressions (28) to (31).

$$D1R'=D4L-D1L \quad (28)$$

$$D1R'=D4L-D1R \quad (29)$$

$$D4L'=0[s] \quad (30)$$

$$D4R'=D4L-D4R \quad (31)$$

The reproduction device 30 delays the reproduction signals transmitted to the first left speaker unit 11L, the first right speaker unit 11R, the fourth left speaker unit 14L, and the fourth right speaker unit 14R by the delay times D1L", D1R", D4L", and D4R", respectively.

The second left speaker unit 12L, the second right speaker unit 12R, the fifth left speaker unit 15L, and the fifth right speaker unit 15R disposed behind the driver U constitute the second speaker unit group 12. As regards the second left speaker unit 12L, the second right speaker unit 12R, the fifth left speaker unit 15L, and the fifth right speaker unit 15R included in the second speaker unit group 12 as well, the delay times are set according to the time alignment method.

Among the second left speaker unit 12L, the second right speaker unit 12R, the fifth left speaker unit 15L, and the fifth right speaker unit 15R, the fifth left speaker unit 15L is the furthest from the reference position P, and thus it is set as a reference. Assuming that the delay time with respect to the fifth left speaker unit 15L is 0, delay times are set for the fifth right speaker unit 15R, the second left speaker unit 12L, and the second right speaker unit 12R in accordance the distance difference.

Specifically, the delay time D5R' with respect to the fifth right speaker unit 15R is set based on the difference in the distance (L5L−L5R). In the similar manner, the delay times D2L' and D2R' with respect to the second left speaker unit 12L and the second right speaker unit 12R are set by the distance difference (L5L−L2L) and the distance difference (L5L−L2R), respectively. The delay times set among the speaker units of the second speaker unit group 12 are expressed by the following Expressions (32) to (35).

$$D2L'=D5L-D2L \quad (32)$$

$$D2R'=D5L-D2R \quad (33)$$

$$D5L'=0[s] \quad (34)$$

$$D5R'=D5L-D5R \quad (35)$$

The delay value (the delay time) D12 set between the first speaker unit group 11 and the second speaker unit group 12 is set based on the longitudinal distance L12 in a similar manner as the first embodiment. That is, the delay value D12 is expressed by the Expression (36).

$$D12[s]=L12[m]/c[m/s] \quad (36)$$

Note that the longitudinal distance L12 is a distance in the longitudinal direction between the speaker unit of the first speaker unit group 11 which is disposed on the rearmost side and the speaker unit of the second speaker unit group 12 which is disposed on the frontmost side. For example, the longitudinal distance L12 is a distance in the longitudinal direction between first left speaker unit 11L and the second left speaker unit 12L.

The delay times D2L", D2R", D5L", and D5R" set for the second left speaker unit 12L, the second right speaker unit 12R, the fifth left speaker unit 15L, and the fifth right speaker unit 15R, respectively, are expressed by the following Expressions (37) to (40).

$$D2L''=D2L'+D12 \quad (37)$$

$$D2R''=D2R'+D12 \quad (38)$$

$$D5L''=D5R'+D12=D12 \quad (39)$$

$$D5R''=D5R'+D12 \quad (40)$$

The reproduction device 30 delays the reproduction signals transmitted to the second left speaker unit 12L, the second right speaker unit 12R, the fifth left speaker unit 15L, and the fifth right speaker unit 15R by the delay times D2L", D2R", D5L", and D5R", respectively.

As described above, the plurality of speaker units disposed on the front side of the driver U constitute the first speaker unit group 11 and the plurality of speaker units disposed on the rear side of the driver constitute the second speaker unit group 12. Further, in each of the speaker unit groups, the delay times are set according to the time alignment method. Further, a delay time in accordance with the longitudinal distance L12 is allotted between the first speaker unit group 11 and the second speaker unit group 12. That is, the delay time in accordance with the longitudinal distance L12 is added to the delay time set according to the time alignment method in the second speaker unit group 12. By this configuration, the same effect as that of the first embodiment can be obtained.

Note that in the aforementioned explanation, each of the first speaker unit group 11 and the second speaker unit group 12 includes four speaker units, however, the number of the speaker units included in either one of the speaker unit groups may be two. In this case, in each of the speaker unit groups, the delay time is set according to the time alignment method while the delay time is set between the two speaker unit groups based on the longitudinal distance L12.

For example, when the number of the speaker units included in the first speaker unit group 11 is two, the delay time shown in the first embodiment is set for the first speaker unit group 11 and the delay time shown in third embodiment is set for the second speaker unit group 12.

On the other hand, when the number of the speaker units included in the second speaker unit group 12 is two, the delay time shown in the first embodiment is set for the second speaker unit group 12 and the delay time shown in the third embodiment is set for the first speaker unit group 11.

Furthermore, when the number of the speaker units included in one speaker unit group is equal to or larger than four, the delay time can be set in a similar manner based on the time alignment method.

The first to third embodiments can be used in combination as appropriate. For example, the second embodiment and the third embodiment can be used in combination. The configuration of the reproduction device 30 shown in FIG. 3 can be applied to the first and third embodiments. The third speaker unit group may be added to the speaker unit arrangement shown in FIG. 4. Alternatively, one or more of the speaker unit groups of the first speaker unit group 11, the second speaker unit group 12, and the third speaker unit group 13 may include four or more speaker units.

Note that in the first to third embodiments, it has been explained on the assumption that the positions of the left and right speaker units in the longitudinal direction are the same, however, the positions of the left and right speaker units in the longitudinal direction may differ. In this case, the longitudinal distances L12, L13, and L23 may be the longitudinal distance from the driver U to the speaker unit on the farther side. For example, in the case of a car having a right-side steering wheel, the delay time is set using the longitudinal distance of the left speaker unit. On other hand, in the case of a car having a left-side steering wheel, the delay time is set using the longitudinal distance of the right speaker unit.

The reproduction device 30 according to the first to third embodiments can also be applied to a speaker system other than an on-vehicle speaker system. That is, the reproduction device and the speaker system according to the embodiments is applicable to a speaker system that is disposed asymmetrically.

The present disclosure made by the inventors of the present application has been explained above in a concrete manner based on the embodiments. However, the present disclosure is not limited to the above-described embodiments, and needless to say, various modifications can be made without departing from the spirit and scope of the present disclosure.

The present disclosure can be applied to a reproduction device that outputs a reproduction signal and an on-vehicle speaker system.

What is claimed is:

1. A reproduction device configured to output a reproduction signal to a speaker system comprising a first speaker unit group disposed in front of a listener and a second speaker unit group disposed behind the listener, the reproduction device comprising:
    a first delay circuit configured to delay a reproduction signal output to a speaker unit included in the first speaker unit group; and
    a second delay circuit configured to delay a reproduction signal output to a speaker unit included in the second speaker unit group, wherein
    the first speaker unit group includes a first left speaker unit and a first right speaker unit,
    the second speaker unit group includes a second left speaker unit and a second right speaker unit, in the first speaker unit group, a first delay time in accordance with a first distance difference between a distance from a reference position to a speaker unit furthest from the reference position and a distance from the reference position to another speaker unit is set for the first delay circuit, and in the second speaker unit group, a second delay time in accordance with a second distance difference between a distance from the reference position to a speaker unit furthest from the reference position and a distance from the reference position to another speaker unit and a first longitudinal distance from a speaker unit included in the first speaker unit group to a speaker unit included in the second speaker group is set for the second delay circuit.

2. The reproduction device according to claim 1, wherein in the second speaker unit group, the sum obtained by adding a second value in accordance with the first longitudinal distance to a first value in accordance with the second distance difference is set as the second delay time.

3. The reproduction device according to claim 1, further comprising a third delay circuit configured to delay the reproduction signal output to a third speaker unit group disposed behind the second speaker unit group, wherein the third speaker unit group includes at least a third left speaker unit and a third right speaker unit, and in the third speaker unit group, a third delay time in accordance with a distance difference between a distance from the reference position to a speaker unit furthest from the reference position and a distance from the reference position to another speaker unit and a second longitudinal distance from a speaker unit included in the first speaker unit group to a speaker unit included in the third speaker unit group is set for a third delay circuit.

4. The reproduction device according to claim 1, wherein the first speaker unit group further comprises a fourth left speaker unit and a fourth right speaker unit.

5. The reproduction device according to claim 1, wherein the second speaker unit group further comprises a fifth left speaker unit and a fifth right speaker unit.

6. The reproduction device according to claim 1, wherein in the first speaker unit group and the second speaker unit group, by suppressing a sound volume level in accordance with the distance difference from the reference position to each of the speaker units, a sound volume is made smaller for the speaker unit closer to the reference position than the other speaker unit is and sounds are output from the speaker units.

7. An on-vehicle speaker system comprising:
the reproduction device according to claim 1; and
the first and second speaker unit groups to each of which the reproduction signal from the reproduction device is input.

8. A reproduction method of reproducing music by a speaker unit system that comprises a first speaker unit group and a second speaker unit group disposed behind the first speaker unit group, the reproduction method comprising:

a step of delaying a reproduction signal by a first delay circuit and outputting the reproduction signal to a first speaker unit group and delaying the reproduction signal by a second delay circuit and outputting the reproduction signal to a second speaker unit group; and a step of outputting the reproduction signal from the first speaker unit group and the second speaker unit group, wherein the first speaker unit group includes at least a first left speaker unit and a first right speaker unit, the second speaker unit group includes at least a second left speaker unit and a second right speaker unit, in the first speaker unit group, a first delay time in accordance with a first distance difference between a distance from a reference position to a speaker unit furthest from the reference position and a distance from the reference position to another speaker unit is set for the first delay circuit, and in the second speaker unit group, a second delay time in accordance with a second distance difference between a distance from the reference position to the speaker unit furthest from the reference position and a distance from the reference position to another speaker unit and a first longitudinal distance from a speaker unit included in the first speaker unit group to a speaker unit included in the second speaker group is set for the second delay circuit.

* * * * *